Aug. 8, 1950     C. E. WUENSCH     2,518,415

SEALING DEVICE

Filed June 5, 1944

INVENTOR.
CHARLES ERB WUENSCH.
BY

ATTY.

Patented Aug. 8, 1950

2,518,415

UNITED STATES PATENT OFFICE 2,518,415

SEALING DEVICE

Charles Erb Wuensch, Saratoga, Calif., by decree of distribution to Eunice L. Wuensch Application June 5, 1944, Serial No. 538,795

5 Claims. (Cl. 286—11)

This invention relates to bearing seals and more particularly to centrifugal seals and sealing means for rotary shafts.

Among the objects of the invention is the prevention of leakage along rotating shafts with the minimum of friction and wear.

Another object is the permission of a limited longitudinal movement of the rotating shaft without causing leakage past the sealing means.

A further object is the provision of a substitute for the conventional stuffing box with its compression gland and the incidental friction and wear on the shaft by the compressed packing.

Another object is the provision of a rotary bearing seal which actively prevents the entry of fluid and grit to the bearing.

Further objects are to provide a construction of maximum simplicity, economy and ease of assembly and such further objects, advantages and capabilities as will later more fully appear and those which are inherently possessed in the device.

In order to disclose the nature of the invention herein reference is made to the accompanying drawing which illustrates a preferred form of the present invention. But it is to be understood that it is not limited to these forms for it may be embodied in modifications within the spirit of the invention and within the scope of the claims following the description.

Figure 1:
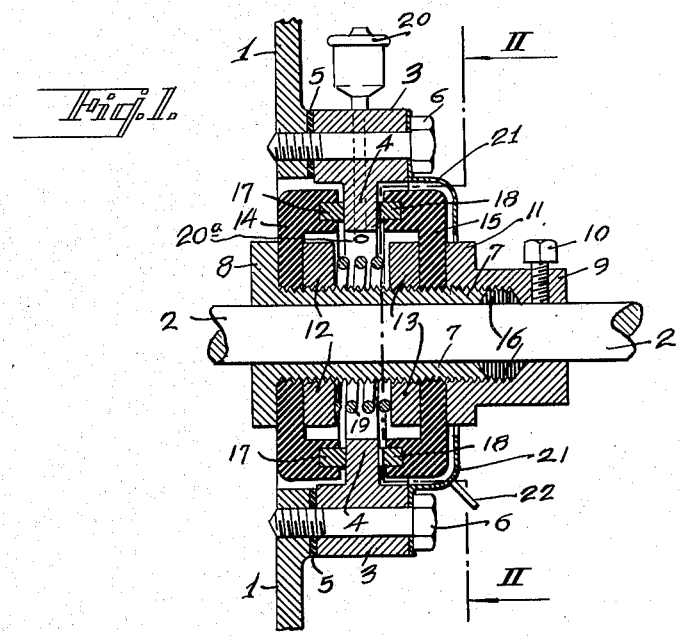
Figure 1 is a vertical section of a bearing seal constructed in accordance with this invention taken on the line I—I of Figure 2.
Figure 2:
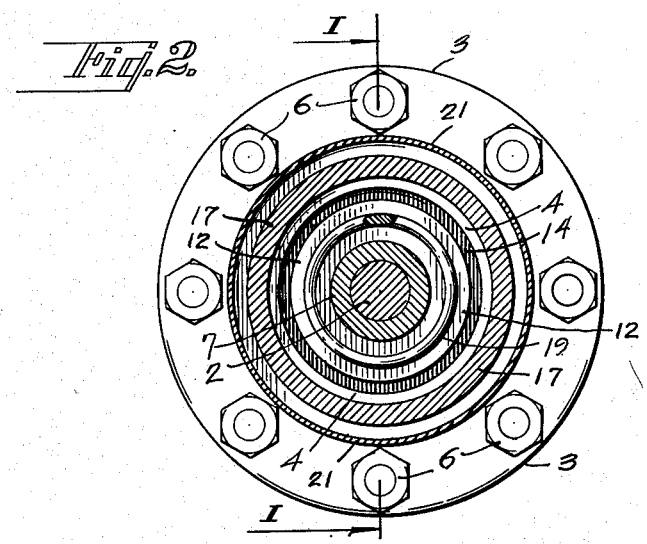
Figure 2 is a front view of the same taken on the line II—II of Figure 1.
Figure 3:
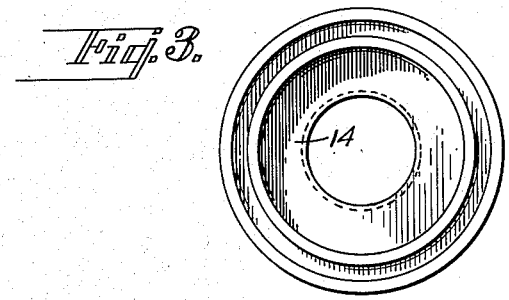
Figure 3 is a front view detail of the sealing member.

In detail the structure illustrated in the drawings, referring first to Figure 1, comprises the wall 1 of a pump casing or the like through which the rotating shaft 2 extends. The sealing annulus 3 is bolted to the wall 1 and has the internal flange 4, surrounding the shaft but out of contact with and spaced from it. A gasket 5 is interposed between the wall 1 and the sealing annulus and is compressed and the assembly held in firm engagement by the bolts such as 6.

The threaded sleeve 7 is keyed to the shaft 2 in any suitable manner and has the inner head flange 8 thereon. The external cap 9 is threaded on the outer end of the sleeve 7 and is fixed to the shaft by the set screw 10. The external cap 9 also has annular flange 11 thereon. Collars 12 and 13 are threaded on the sleeve between the flanges 8 and 11.

The annular sealing rings 14 and 15 encircle the shaft and are compressed between the flanges 8 and 11 and the collars 12 and 13 respectively, so they will rotate as a unit with sleeve 7. The space between the cap 9 and the end of the sleeve 7 can be filled with a compressible packing 16 to prevent leakage at this point. As a further precaution against leakage the rings 14 and 15 can be threaded on the sleeve 7.

The sealing rings 14 and 15 are preferably composed of a suitable resilient material or rubber-like compound that is slightly compressible and laterally yielding. The replaceable sealing lips 17 and 18 are inserted in the face of the inturned heads of the sealing rings and bear against the opposite sides of the flange 4 of the stationary sealing annulus 3 and prevent leakage at these points. These lips are preferably composed of a dense compound containing graphite, mica or other suitable smooth wearing material that will function without undue friction and without cutting the flange 4. They are preferably in the form of split rings which can be removed and replaced with facility.

A stiff expansion spring retainer 19 surrounding the sleeve 7 is interposed between the collars 12 and 13, its roughened ends frictionally bearing against the collars to prevent the collars from backing away from their respective sealing rings 14 and 15. If lubrication is by means of a suitable hydrocarbon, it may be introduced by the cup 20 feeding through a hole 20a passing through the flange 4. If water is used as the lubricant, then the cup 20 is replaced by a suitable coupling for attaching a continuous source of water. The exuding water or other lubricant lubricates the faces of lips 17 and 18 pressing against both surfaces of annulus 4 and assists in preventing the entrance through leakage of air or gritty matter from the pump or the fluid being sealed against.

The whole sealing unit described can be assembled on the sleeve, ready for installation by slipping the sleeve over the end of the shaft, keying the same thereto, bolting the ring 3 to the casing wall 1 and tightening the setscrew 10.

Centrifugal force tends to force the lubricating water or other lubricant against the sealing lips 17 and 18 to lubricate their running contact with the flange 4. The head pressure against the sealing ring 14 if the pump is operating under pressure, tends to force it against the flange 4 and increase the sealing effect. A cup shaped cover plate 21 is fastened to the fixed sealing annulus 3 to catch any momentary leakage from the pump when starting and the lubricating water during operation, if water lubrication is used. These drain through a small pipe 22 at the bottom of the cover plate 21.

It should be observed that in this device the peripheral velocity of the sealing rings 14 and 15 is greater than at any other point near the revolving shaft. Accordingly travel of air or liquid will be actually diverted from the point of maximum velocity. Because of the speed of rotation and the centrifugal action resulting therefrom, there will be no tendency for air or liquid to enter the space represented by the clearance between the periphery of the sealing rings 14 and 15 and the fixed sealing annulus 3.

When the pump is shut down the sealing ring 14 will press against the flange 4 and act as a check valve preventing any leakage from the pump. If the pump is working under suction the pressure exerted from the sealing ring 15 against the flange 4 will supplement the sealing action. The flexible or elastic sealing rings 14 and 15 are slightly curved and may be heavier at the periphery (this is augmented by the weight of replaceable packing rings 17 and 18). When the feed to the pump is operating under a slight pressure head it is not necessary that the rings 14 and 15 press against the faces of annulus 4 and no lubricating water is necessary. It is apparent that the wearing faces of annulus 4 can be faced with rubber or any other suitable material and that they may be made replaceable.

I claim:

1. A bearing seal comprising in combination a threaded sleeve having a head flange, a cap threaded on the opposite end of said sleeve, spaced collars threaded on said sleeve between said head flange and cap, a sealing annulus encircling said sleeve, and sealing rings fixed between said head flange and said collars and cap respectively and bearing against the opposite sides of said annulus.

2. A bearing seal comprising in combination a threaded sleeve having a head flange, a cap threaded on the opposite end of said sleeve, spaced collars threaded on said sleeve between said head flange and cap, a sealing annulus encircling said sleeve, sealing rings fixed between said head flange and said collars and cap and bearing against the opposite sides of said annulus respectively, and an expansive retainer interposed between said collars.

3. A bearing seal comprising in combination a threaded sleeve having a head flange, a cap threaded on the opposite end of said sleeve, spaced collars threaded on said sleeve between said head flange and cap, a sealing annulus encircling said sleeve, resilient sealing rings fixed between said head flange and said collars and cap, replaceable sealing lips on said sealing rings and bearing against the opposite sides of said annulus respectively, and an expansive retainer interposed between said collars.

4. In a centrifugal bearing seal in combination, a sleeve having a head flange on one end thereof and adapted to be secured to a rotating shaft, a cap at the opposite end of and carried on said sleeve, spaced collars carried by said sleeve between said flange and said cap, a fixed sealing annulus encircling said sleeve, and sealing rings fixed between said flange and collar and said collar and cap respectively bearing against opposite sides of said annulus.

5. In a centrifugal water lubricated bearing seal in combination, a threaded sleeve adapted to be secured to a rotating shaft, a stationary sealing annulus encircling said sleeve, sealing rings fixed on and carried by said sleeve with replaceable sealing faces therein bearing against the opposite sides of said annulus, means for supplying water for lubrication of the sealing rings, and external means having a suitable external drain for enclosing the entire sealing assembly.

CHARLES ERB WUENSCH.

REFERENCES CITED

The following references are of record in the file of this patent:

UNITED STATES PATENTS

| Number | Name | Date |
|---|---|---|
| 1,846,598 | Hodgkinson | Feb. 23, 1932 |
| 1,850,571 | Shively | Mar. 22, 1932 |
| 1,931,733 | Leibing | Oct. 24, 1933 |
| 1,983,855 | Jenkins | Dec. 11, 1934 |
| 2,140,356 | Gutman | Dec. 13, 1938 |
| 2,144,691 | Schmal | Jan. 24, 1939 |
| 2,227,408 | Hately | Dec. 31, 1940 |
| 2,418,707 | Groot | Apr. 8, 1947 |

FOREIGN PATENTS

| Number | Country | Date |
|---|---|---|
| 19,968 | Great Britain | of 1909 |